United States Patent
Kikuchi et al.

(10) Patent No.: US 7,846,235 B2
(45) Date of Patent: Dec. 7, 2010

(54) METHOD FOR PRODUCING METALLIC IRON

(75) Inventors: Shoichi Kikuchi, Kobe (JP); Osamu Tsuge, Kobe (JP); Gilbert Yould Whitten, Charlotte, NC (US); Brian William Voelker, Charlotte, NC (US)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/183,871

(22) Filed: Jul. 31, 2008

(65) Prior Publication Data

US 2009/0183600 A1 Jul. 23, 2009

Related U.S. Application Data

(63) Continuation of application No. 10/542,359, filed as application No. PCT/JP2004/000330 on Jan. 16, 2004, now abandoned.

(60) Provisional application No. 60/440,369, filed on Jan. 16, 2003.

(51) Int. Cl.
C21B 13/08 (2006.01)
(52) U.S. Cl. .......................................... 75/484; 75/503
(58) Field of Classification Search .................. 75/484, 75/503
See application file for complete search history.

(56) References Cited

U.S. PATENT DOCUMENTS

| 6,036,744 | A | 3/2000 | Negami et al. |
| 6,126,718 | A | 10/2000 | Sawa et al. |
| 6,210,462 | B1 | 4/2001 | Kikuchi et al. |
| 6,251,161 | B1 | 6/2001 | Tateishi et al. |
| 6,413,295 | B2 | 7/2002 | Meissner et al. |
| 6,432,533 | B1 | 8/2002 | Negami et al. |
| 6,506,231 | B2 | 1/2003 | Negami et al. |
| 6,569,223 | B2 | 5/2003 | Tanigaki et al. |
| 6,592,647 | B2 | 7/2003 | Hino et al. |
| 6,592,649 | B2 | 7/2003 | Kikuchi et al. |
| 6,602,320 | B2 | 8/2003 | Fuji et al. |
| 6,630,010 | B2 | 10/2003 | Ito et al. |
| 6,648,942 | B2 | 11/2003 | Hoffman et al. |
| 6,749,664 | B1 | 6/2004 | Hoffman et al. |
| 7,384,450 | B2 | 6/2008 | Kikuchi |

(Continued)

FOREIGN PATENT DOCUMENTS

JP 2002-167613 6/2002

(Continued)

*Primary Examiner*—George Wyszomierski
*Assistant Examiner*—Tima M McGuthry-Banks
(74) *Attorney, Agent, or Firm*—Oblon, Spivak, McClelland, Maier & Neustadt, L.L.P.

(57) ABSTRACT

A method for producing metallic iron in which a mixture including a carbonaceous reducing agent and iron oxide is fed onto a hearth of a moving hearth reducing-melting furnace and is then heated so that the iron oxide is reduced and melted. Metallic iron to be obtained is cooled and is then discharged outside the furnace for recovery. Prior to the feed of raw agglomerates, a granular hearth material is bedded on the moving hearth for forming a layered renewable hearth which can be renewed. Part or the entirety of the renewable hearth which was degraded during operation is renewed, and the hearth material for forming a new renewable hearth is fed. The surface of the newly formed hearth is then leveled and mixture is subsequently fed.

20 Claims, 9 Drawing Sheets

U.S. PATENT DOCUMENTS

| | | |
|---|---|---|
| 2002/0005089 A1 | 1/2002 | Nagata et al. |
| 2003/0061909 A1 | 4/2003 | Negami et al. |
| 2004/0173054 A1 | 9/2004 | Tsuge et al. |
| 2004/0211295 A1 | 10/2004 | Kikuchi et al. |
| 2007/0051203 A1 * | 3/2007 | Ishiwata et al. ............... 75/484 |

FOREIGN PATENT DOCUMENTS

| | | |
|---|---|---|
| JP | 2003-49213 | 2/2003 |
| WO | WO 97/33135 | 9/1997 |
| WO | WO 98/46953 | 1/1998 |
| WO | WO 99/20801 | 4/1999 |
| WO | WO 00/29628 | 5/2000 |
| WO | 01/73137 | 10/2001 |

\* cited by examiner

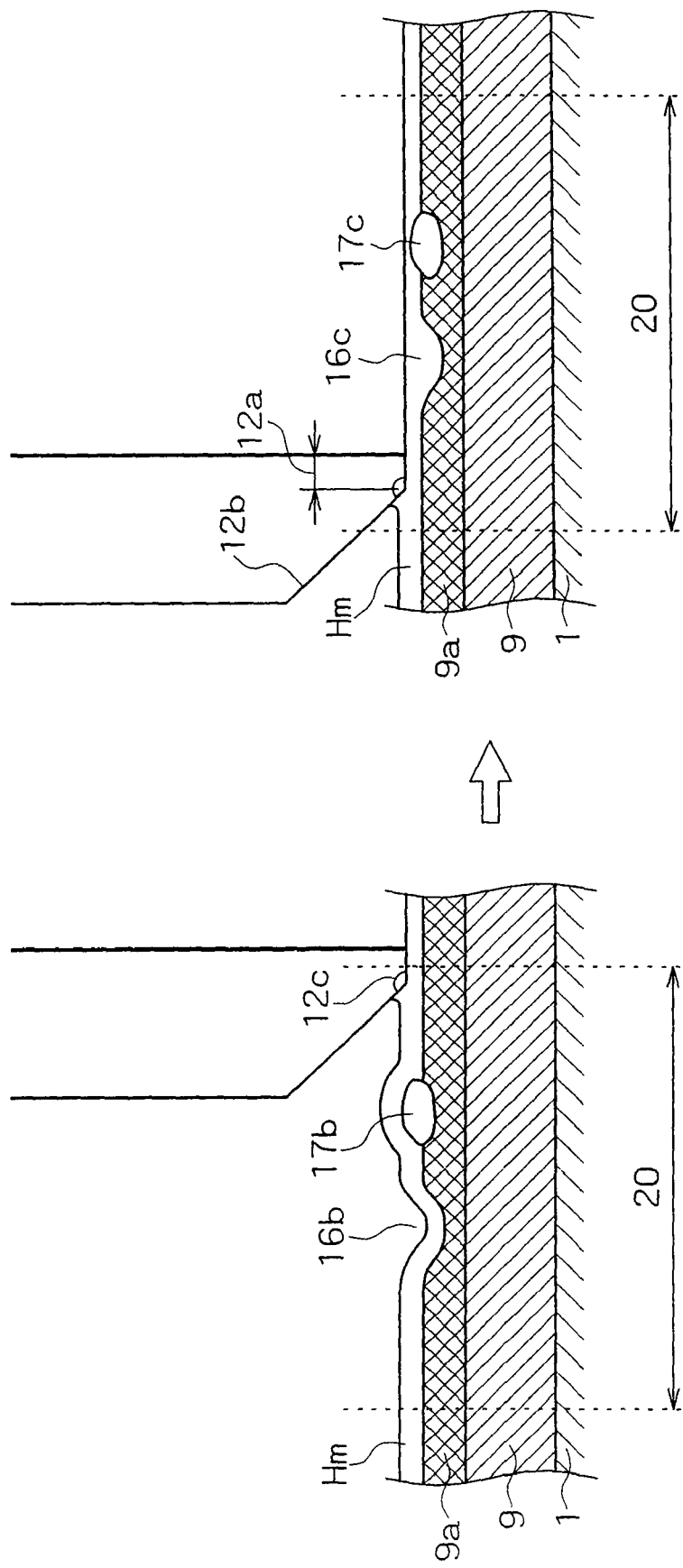

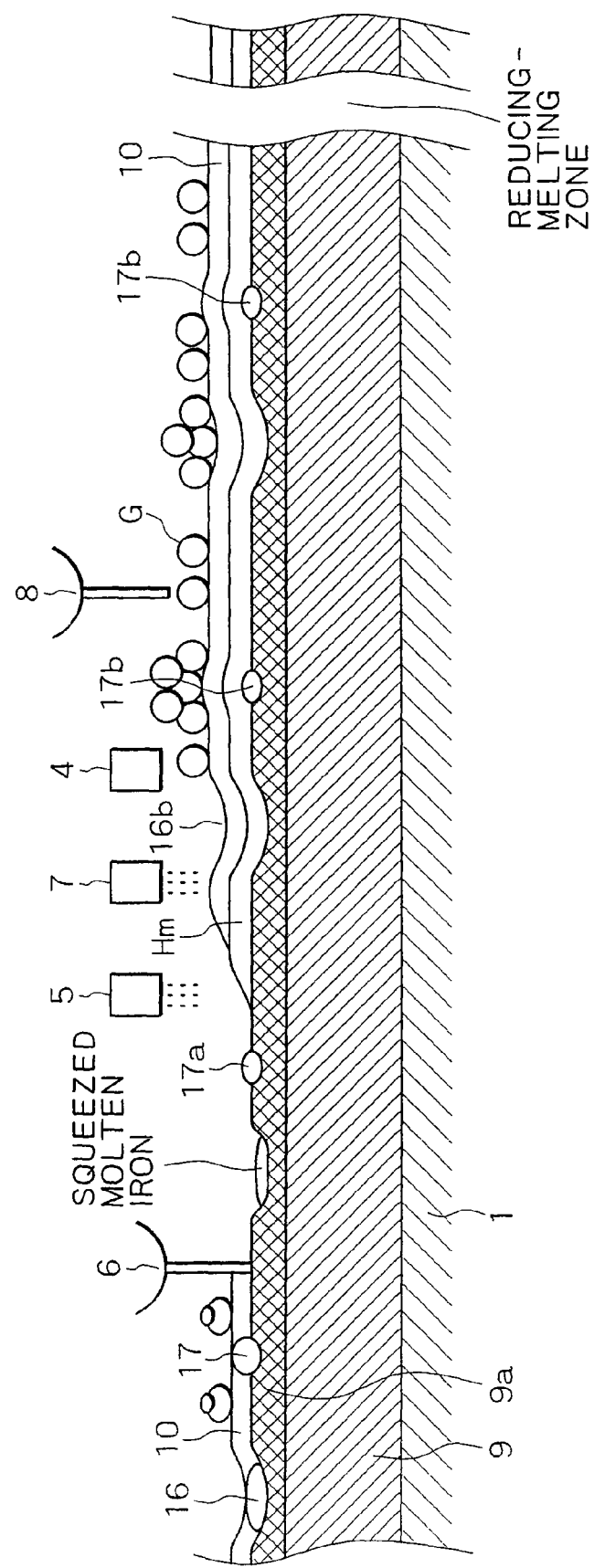

METHOD FOR PRODUCING METALLIC IRON

CROSS-REFERENCE OF RELATED APPLICATIONS

The application is a continuation of U.S. patent application Ser. No. 10/542,359 filed Jul. 14, 2005, now abandoned which is the National Stage to PCT/JP04/000330, filed Jan. 16, 2004, which claims priority to provisional application No. 60/440,369, filed Jan. 16, 2003.

BACKGROUND OF THE INVENTION

1. Field of the Invention

The present invention relates to methods for producing metallic iron, and more particularly, relates to an improved method for producing metallic iron. According to the improved method described above, when the metallic iron is produced by the steps of feeding a mixture, which contains a carbonaceous reductant such as coal and iron oxide such as iron ore, onto a moving hearth of a moving hearth reducing-melting furnace, then reducing and melting the iron oxide by heating, and subsequently cooling the metallic iron thus obtained for production, a continuous operation can be stably performed while damage done to the moving hearth is reduced as small as possible, or damaged surface portions of the hearth is repaired during operation.

2. Description of the Prior Art

Among methods for producing reduced iron, the following method has been known. In the method mentioned above, after a mixture of iron oxide such as iron ore and a carbonaceous reductant such as coal is fed onto a hearth of a rotary furnace or a moving hearth reducing furnace such as a straight grate and is then heated by radiant heat in the furnace while being moved therethrough so that the iron oxide is reduced by the carbonaceous reductant to produce reduced iron, the reduced iron thus produced on the hearth is discharged outside the furnace by optional discharge means such as a screw mechanism.

However, when the mixture is composed of agglomerates in the form of pellets or the like, and the agglomerates as mentioned above are fed onto the hearth, powders are generated from the agglomerates by dropping impact or the like and are then deposited on the hearth. Since the powders thus deposited are heated and reduced together with the agglomerates, the deposited powders are formed into powdered reduced iron, and the agglomerates are formed into granular reduced iron. The granular reduced iron is discharged outside the furnace by a discharge screw; however, on the other hand, the powdered reduced iron is squeezed into the surface of the hearth. Accordingly, when a continuous operation is performed, the amount of the powdered reduced iron squeezed into the surface of the hearth is increased, and in addition, the powders of the reduced iron are bonded to each other by a compression force of the discharge screw; hence, a problem has occurred in that plate-shaped reduced iron is formed on the surface of the hearth. In the case of a moving hearth reducing furnace, since a heating and reducing zone is at a high temperature, and a raw material-feeding zone and a discharge zone are at a relatively low temperature, cracking or warping of the plate-shaped reduced iron formed on the surface of the hearth is likely to occur because of the temperature differences described above. In addition, when the plate-shaped reduced iron is caught by a discharge screw, troubles such as shutdown thereby occur.

The inventors of the present invention have already proposed (U.S. Pat. No. 3,075,721) a technique that solves the problems described above. In the technique mentioned above, a hearth-forming material is fed into a furnace together with agglomerates, powders generated from the agglomerates are deposited on a surface of a hearth to form an iron oxide layer thereon, and in addition, a discharge device is intermittently or continuously moved in the direction toward the top of the furnace so that the operation is carried out while the gap between the discharge device and the iron oxide layer formed on the surface of the hearth is adjusted. Accordingly, powdered reduced iron is prevented from being squeezed into the surface of the hearth by the discharge device, the formation of plate-shaped reduced iron on the hearth is prevented thereby, and the deposited reduced iron powders are periodically scraped off; hence, a continuous operation can be carried out. The continuous operation can be carried out since the surface of the hearth is periodically renewed and repaired by scraping off the plate-shaped reduced iron formed on the surface of the hearth; however, the hearth itself is not scraped off.

In addition, as a method for producing metallic iron, a production method has been known in which after a mixture of iron oxide and a reductant is fed into a moving hearth reducing-melting furnace such as a rotary hearth furnace and is heated by radiant heat in the furnace while moving therethrough so that the iron oxide is reduced by the reductant, and subsequently, carburization, melting, aggregation, and slag separation are performed, granular solid metallic iron is discharged outside the furnace after cooling and solidification. For example, the inventors of the present invention has proposed a technique disclosed in Japanese Unexamined Patent Application Publication 2000-144224 in which damage done to a hearth caused by molten iron is prevented by forming a vitreous hearth layer composed of iron oxide, carbon, and a silica compound on the surface of the hearth of a rotary hearth furnace. However, when the operation is continuously performed, the vitreous layer is degraded by slag infiltration and corrosion, and hence improvement has been still required for performing a stable and continuous operation.

The present invention was made in consideration of the circumstances described above, and an object of the present invention is to provide a method for producing metallic iron, the method being suitable for performing a long continuous operation. According to the method described above, even when powdered metallic iron is squeezed into a surface of a hearth, or the hearth is damaged by slag infiltration and corrosion, the removal and repair can be easily performed, and the operation rate and maintainability of the hearth can be improved.

SUMMARY OF THE INVENTION

A method for producing metallic iron, which could solve the problems described above, according to the present invention is a method for producing metallic iron, in which after a mixture including a carbonaceous reducing agent and iron oxide is fed onto a moving hearth of a moving hearth reducing-melting furnace and is then heated so that the iron oxide is reduced and melted, metallic iron to be obtained is cooled and is then discharged outside the furnace for recovery. The method described above comprises, prior to the feed of the mixture, bedding a granular hearth material on the moving hearth for forming a layered renewable hearth which can be renewed; removing part or the entirety of the renewable hearth, which is degraded during operation, and newly feeding the hearth material for newly forming a renewable hearth;

leveling the surface of the newly formed hearth; and subsequently feeding the mixture for producing the metallic iron.

In addition, a method for producing metallic iron, according to the present invention, is a method for producing metallic iron, in which after a mixture including a carbonaceous reducing agent and iron oxide is fed onto a hearth of a moving hearth reducing-melting furnace and is then heated so that the iron oxide is reduced and melted, metallic iron to be obtained is cooled and is then discharged outside the furnace for recovery. The method described above comprises, prior to the feed of the mixture, bedding a hearth material on the hearth for forming a layered renewable hearth which can be renewed; feeding the hearth material on the surface of the renewable hearth which is degraded during operation so as to form a new surface of the hearth; leveling the newly formed surface of the hearth; and subsequently feeding the mixture for producing the metallic iron.

BRIEF DESCRIPTION OF THE DRAWINGS

FIG. 9 is a schematic view for illustrating the surface conditions of a renewable hearth.

FIG. 10 is a schematic view for illustrating the case in which renewable hearth-leveling means is not provided.

DETAILED DESCRIPTION OF THE PREFERRED EMBODIMENTS

The inventors of the present invention discovered a method comprising the steps of bedding a hearth material on a moving hearth for forming a renewable hearth which can be renewed; feeding an atmosphere-adjusting agent and a mixture of raw materials onto the renewable hearth for reducing and melting iron oxide; removing (or not removing) part or the entirety of the renewable hearth which is degraded during operation; feeding a new hearth material for newly forming a renewable hearth; and subsequently feeding a mixture of raw materials for reducing and melting iron oxide. According to the method described above, even when powdered metallic iron is squeezed into the surface of the renewable hearth, or the renewable hearth is damaged by infiltration and corrosion caused by slag, the degraded renewable hearth can be easily removed and repaired, and hence the operation rate and maintainability of the hearth can be improved as compared to those in the past. However, even when the renewable hearth is newly formed by feeding the hearth materials, slag may be concentrated at part of the renewable hearth, or the mixture of raw materials thus fed may be unevenly heated in some cases, and hence improvement has been still required in terms of a long and stable operation.

Through research on the causes of the inconveniences described above carried by the inventors of the present invention, it was found that in the case in which concave portions are formed on the surface of the renewable hearth when the degraded portions thereof are removed, or in the case in which convex portions are formed on the surface of the renewable hearth when slag and the like are not removed, due to the concave and convex portions described above, the mixture of raw materials is unevenly heated, or overgrowth or melt of metallic iron or slag is facilitated, and hence the operation is interfered with thereby. Through intensive study on methods for solving the problems described above, it was found that when a method is employed in which a renewable hearth is newly formed, the surface thereof is leveled, and a mixture of raw materials is then fed, the objects described above can be achieved, and hence the present invention was made.

Hereinafter, embodiments of the present invention will be described in detail with reference to figures; however, the embodiments are typical examples, and the present invention is not limited to the examples shown in the figures.

Figure 1:
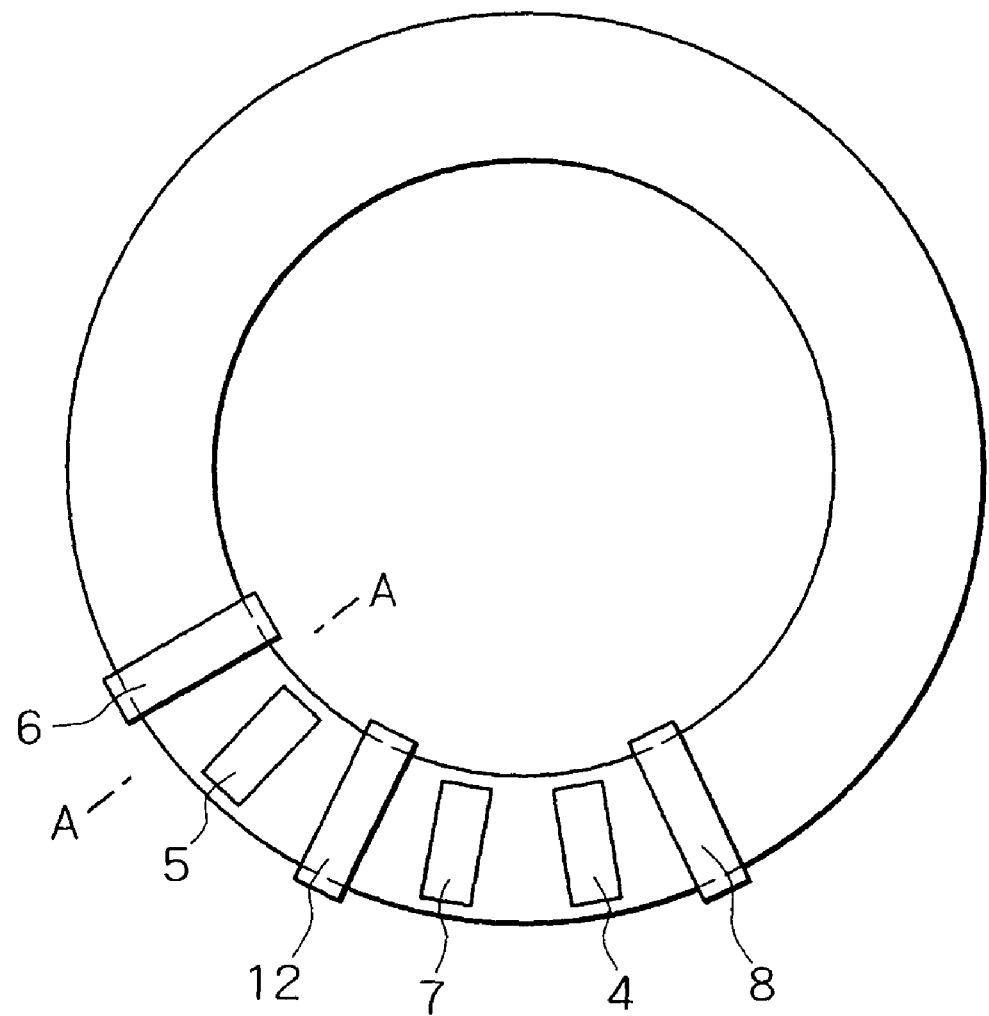
FIG. 1 is a schematic view for illustrating one example of a circular moving hearth reducing-melting furnace to which the present invention is applied.
Figure 2:
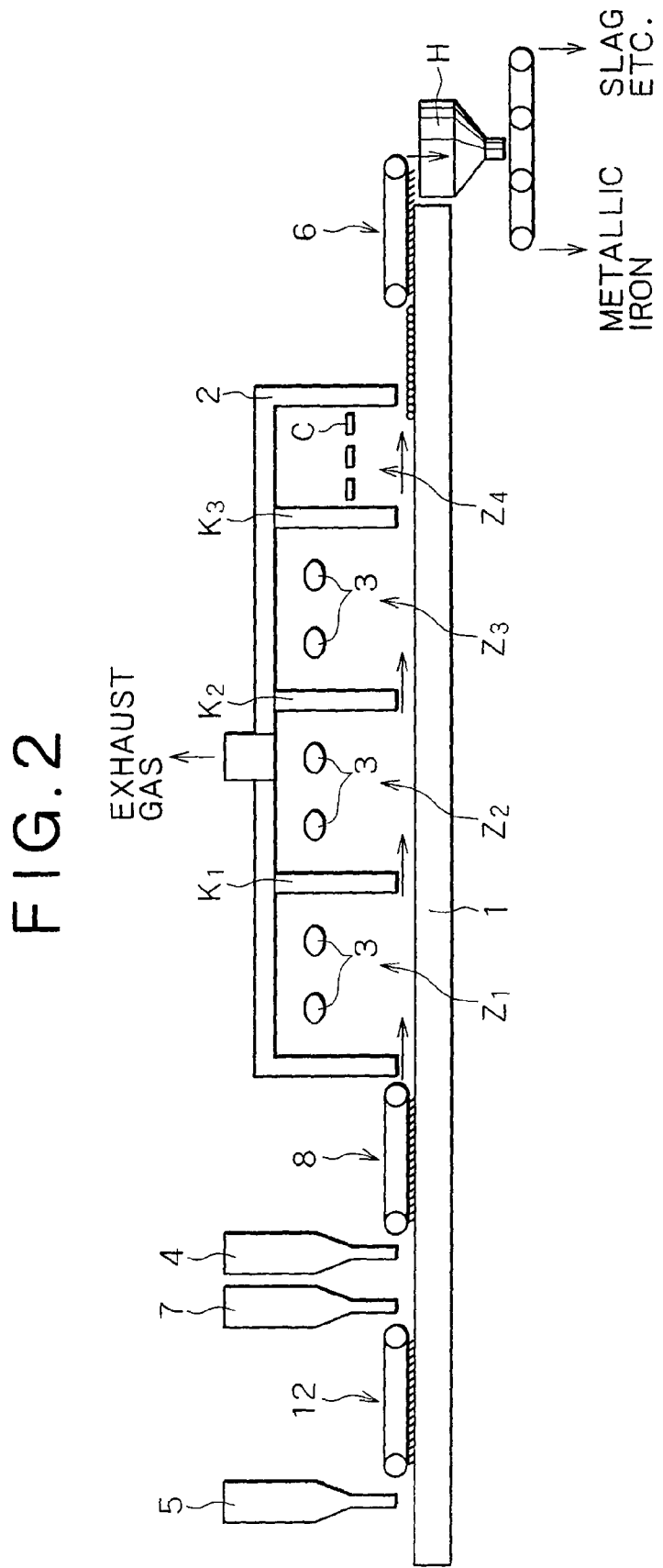
FIG. 2 is a cross-sectional view for illustrating the reducing-melting furnace developed in the rotation direction of the moving hearth in FIG. 1.

FIGS. 1 and 2 are schematic views for illustrating one example of a moving hearth reducing-melting furnace (rotary furnace), the furnace having a dome structure in which a doughnut-shaped rotary moving hearth is provided; FIG. 1 is a schematic plan view; and FIG. 2 is a schematic cross-sectional view for illustrating the rotary moving hearth in FIG. 1 which is developed (after cutting a part indicated by the line A-A in FIG. 1) in the rotary moving direction in order to facilitate understanding of the furnace. Reference numeral 1 in the figure indicates a moving hearth, reference numeral 2 indicates a furnace body covering the moving hearth, and the moving hearth 1 is formed to be driven at a desired speed by a drive device not shown in the figure.

In the present invention, as the mixture of raw materials, agglomerates (hereinafter referred to as "raw agglomerates") containing a carbonaceous reductant and iron oxide will be described by way of example; however, in addition to the agglomerates, powder may also be used in the present invention. In addition, as the agglomerates, various shapes such as pellets or briquettes may also be mentioned by way of example.

In FIG. 2, the furnace body 2 is shown as a preferable example, and the inside of the furnace body 2 is divided into a reducing zone $Z_1$ to a cooling zone $Z_4$ by partitions $K_1$ to $K_3$. At the upstream side in the hearth moving direction, raw agglomerate-feeding means 4 is provided at a first position, hearth material-feeding means 5 is provided at a third position, atmosphere-adjusting agent-feeding means 7 is provided, renewable hearth-leveling means 12 is provided between the first and third positions and raw material-leveling means 8 are disposed so as to oppose the moving hearth 1, and in addition, at the downstream side (since the rotary structure is formed, this side is actually positioned upstream with respect to the hearth material-feeding means 5 and just in front thereof) in the moving direction, a discharge device 6 is provided at a second position.

In addition, on appropriate positions of a wall surface of the furnace body 2, a plurality of combustion burners 3 is provided, and by transmitting combustion heat of the combustion burners 3 and radiant heat thereof to the raw agglomerates provided on the moving hearth 1, heating and reduction of the raw agglomerates are carried out.

When this reducing-melting furnace is operated, while the moving hearth 1 is rotated at a predetermined speed, the raw agglomerates are fed on the moving hearth 1 from the raw agglomerate-feeding means 4 so as to have an appropriate thickness. While being moved through reducing-melting zones $Z_1$ to $Z_3$, the raw agglomerates fed on the hearth 1 receives the combustion heat and radiant heat by the combustion burners 3 and are then reduced by carbon monoxide generated by the reaction between the iron oxide and the carbonaceous reducing agent, which are contained in the raw agglomerates, thereby forming reduced iron which is substantially thoroughly reduced. When being heated in a carbon-rich atmosphere, this reduced iron is carburized, melted, and aggregated while being separated from by-product slag to form granular molten metallic iron, and this molten metallic iron is then solidified by cooling in the cooling zone $Z_4$ using optional cooling means C and is sequentially discharged by the discharge device 6 positioned at the downstream side of the cooling zone $Z_4$. In this step described above, although being discharged together with the by-produced slag, the granular metallic iron is separated from the slag by optional separation means (sieves, magnetic separators, or the like) after passing through a hopper H, and as a result, granular metallic iron can be obtained having an iron purity of approximately 95% or more, and more preferably, having an iron purity of approximately 98% or more and containing a significantly small amount of slag component.

In particular, the present invention primarily focuses on the protection of the hearth forming the moving hearth 1 when highly pure metallic iron is produced in the moving hearth reducing-melting furnace described above, and hence, hereinafter, a method for repairing and renewing the hearth will be primarily described. However, the configuration of the moving hearth reducing-melting furnace to which the present invention is applied is not limited to the shape and the structure shown in FIGS. 1 and 2, and as long as a moving type hearth is provided as a constituent element, the present invention may be effectively used for a moving hearth reducing-melting furnace having any structure such as a straight grate type.

As described above, according to the present invention, in a production facility for producing metallic iron by the steps of feeding raw agglomerates, which contains iron oxide such as iron ore as an iron source and a carbonaceous reducing agent such as coal functioning as a reducing agent for the iron oxide, on the hearth of the moving hearth reducing-melting furnace followed by heating for reducing and melting the iron oxide, and discharging obtained metal iron outside the furnace after cooling, since the moving hearth 1 is protected which functions as a support layer when production of metallic iron is continuously performed by heating, reducing, carburizing, and melting, and the surface of the renewable hearth made of the hearth material is renewed, a stable operation can be carried out.

In addition, the basic concept of the present invention is to produce metallic iron by the sequential steps of, prior to the feed of raw agglomerates, bedding a granular hearth material (hereinafter, simply referred to as "hearth material" in some cases) on a moving hearth for forming a layered renewable hearth; removing part or the entirety of the renewable hearth which is degraded during operation; newly feeding the hearth material for newly forming a renewable hearth; leveling the surface of the newly formed hearth; and subsequently feeding the mixture described above.

Figure 3:
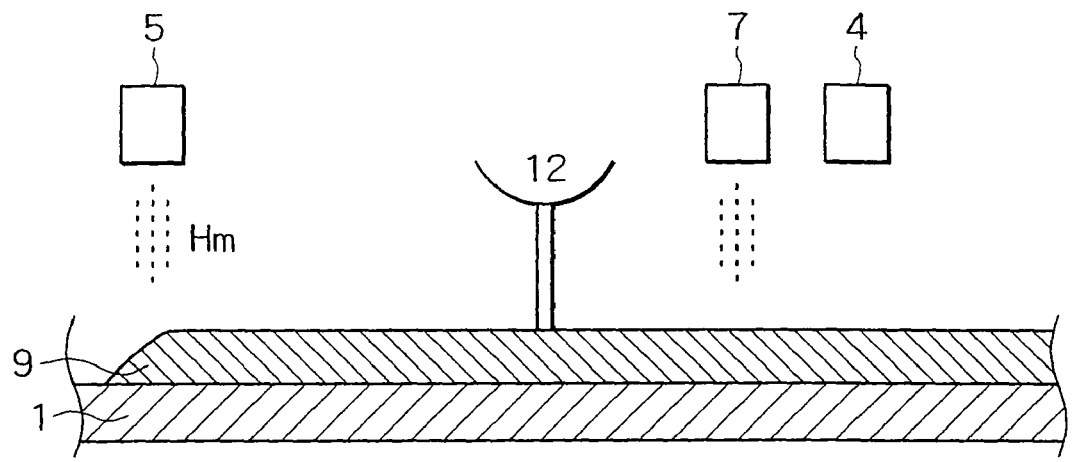
FIG. 3 is a schematic view for illustrating the initial formation state of a renewable hearth.
Figure 4:
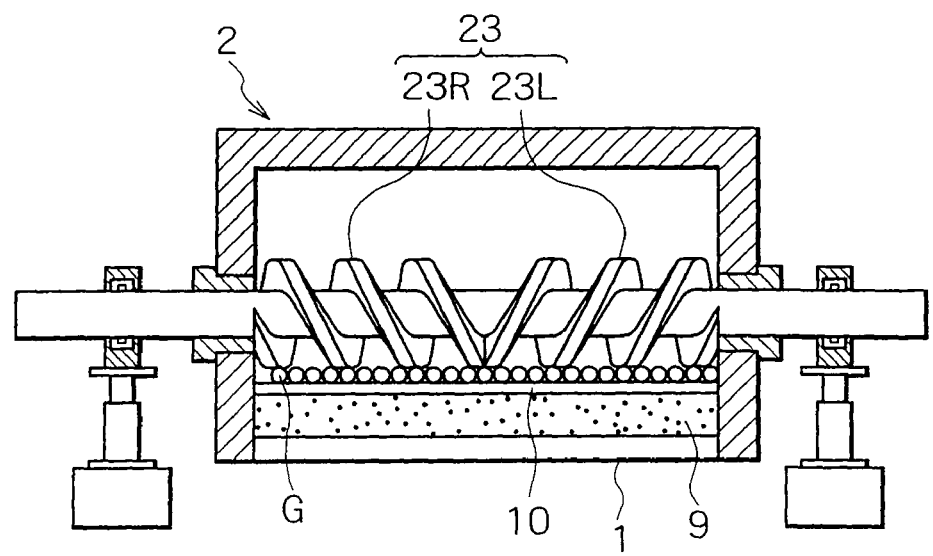
FIG. 4 is a schematic view for illustrating one example of raw material-leveling means.

FIGS. 3 and 4 are schematic cross-sectional views for illustrating one preferable embodiment of the present invention. When the operation is started, prior to the feed of the raw agglomerates, a layered renewable hearth 9, which can be renewed, is formed by bedding the hearth material on the moving hearth 1 of the moving hearth reducing-melting furnace. The method for feeding the hearth material is not specifically limited; however, since being preferably bedded to have a uniform thickness on the moving hearth 1, it is recommended that, while the moving hearth 1 is moved at a predetermined speed, the hearth material in a predetermined amount be fed from the hearth material-feeding means 5 onto the moving hearth 1. In addition, after the hearth material is fed onto the moving hearth 1, the hearth is preferably rotated while the hearth material thus fed is leveled by the renewable hearth-leveling means 12 so that the renewable hearth layer has a predetermined thickness. In the step described above, since the surface of the renewable hearth is compacted while being leveled by the renewable hearth-leveling means 12, a renewable hearth having appropriate strength and smoothness can be formed. The renewable hearth thus formed is a layer formed of granules right after the formation thereof, however, while being reduced and melted, the granules are bonded to each other and solidified so that part or all of the renewable hearth may be discharged by the discharge device 6.

In this embodiment, the thickness of the renewable hearth is not particularly limited; however, in order to prevent refractories forming the moving hearth 1 from being damaged by molten slag, which infiltrates the renewable hearth and reaches the moving hearth 1, it is recommended that the thickness of the renewable hearth be preferably 5 mm or more, and more preferably, 10 mm or more.

After the renewable hearth having a predetermined thickness is formed, raw agglomerates G are fed onto the renewable hearth from the raw agglomerates-feeding means 4. The raw agglomerates G are adjusted so as to have a uniform thickness in the direction intersecting the moving direction of the renewable hearth by the raw material-leveling means 8. The raw material-leveling means 8 is means for smoothing overlapped raw agglomerates thus fed so as to be disposed uniformly in the width direction of the hearth, continuously in the moving direction thereof, and densely, and a known leveler may be used. For example, as shown in FIG. 4, the raw agglomerates G on the hearth may be moved in the width direction of the hearth by rotating a spiral blade 23 (23R, 23L). The structure of a particular raw material-leveling means is shown in Japanese Patent Application No. 11-243407.

As described with reference to FIG. 2, in a process in which the raw agglomerates are moved through the zones $Z_1$ to $Z_3$ of the reducing-melting furnace, iron oxide contained in the agglomerates is heated by the heat generated by the burners and the radiant heat to form reduced iron by solid reduction. Subsequently, since the reduced iron thus formed is further heated and carburized, the melting point thereof is decreased, thereby forming molten iron. In addition, while being separated from by-product slag, the molten iron particles thus formed adhere to each other, aggregate, and grow to form relatively large granular metallic iron, and by-product slag Sg aggregates and is then separated therefrom. Next, cooling is performed for those described above in the cooling zone $Z_4$, and solidified granular metallic iron Fe and the slag Sg are discharged outside the furnace by the discharge device 6.

Figure 5:
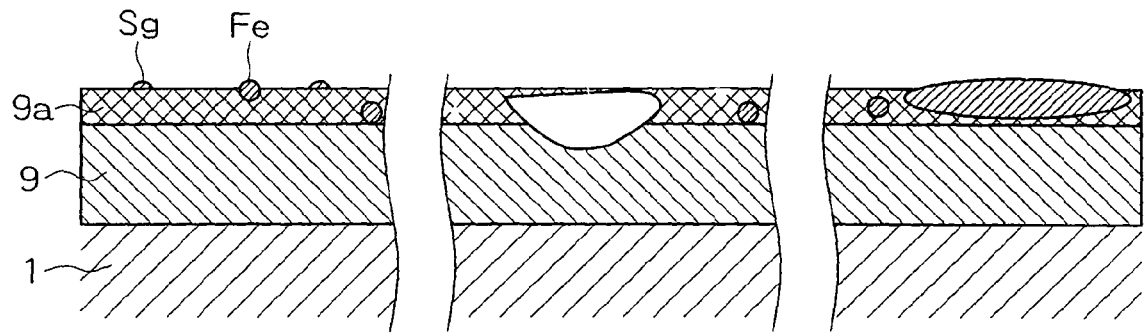
FIG. 5 is a schematic view for illustrating degradation of a renewable hearth.

Metallic iron can be continuously produced by repeating the operation described above: however, with the operation time, the renewable hearth is degraded (degraded portion 9*a* of renewable hearth) by infiltration of the slag and molten iron, and hence stable metallic iron production cannot be continued. Examples of degradation of the renewable hearth are shown in FIG. 5. For example, when part of the molten slag by-produced in a reducing an melting step infiltrates the renewable hearth, and when the amount of slag thus infiltrated is increased, a corroded area of the renewable hearth is increased, the renewable hearth is softened since the melting point thereof is decreased, and the smoothness of the renewable hearth is lost since the renewable hearth is degraded and expanded; hence, stable metallic iron production cannot be continued. In particular, when the infiltration and corrosion caused by molten slag proceeds, the moving hearth 1 may be damaged in some cases, and in this case, after the operation is stopped, the refractories forming the moving hearth 1 must be repaired.

When discharged by the discharge device 6, the granular metallic iron Fe and the slag Sg may be squeezed by the operation of the discharge device in some cases. In particular, they are likely to be squeezed into the hearth that is softened as described above. When the renewable hearth with the slag Sg squeezed therein is again moved through the reducing-melting zones, the slag Sg exposed to a high temperature is melted and further infiltrates the hearth. In addition, when the renewable hearth with the metallic iron Fe squeezed therein is again moved through the reducing-melting zones, the metal Fe exposed to a high temperature is melted and may be overgrown in some cases by combination with other metallic iron squeezed into the renewable hearth or the metal Fe produced thereon. When the overgrowth described above proceeds, molten iron, which cannot be sufficiently cooled and solidified by the cooling capability of the cooling zone, reaches the discharge device 6 and may not be discharged outside the furnace in some cases. But depending on the discharge means, fine metallic iron Fe and slag Sg, which do not sufficiently aggregate and grow in the melting step, are likely to be squeezed into the renewable hearth.

The metal Fe and slag Sg (for example, parts of the metal Fe and slag Sg project above the surface of the renewable hearth, and the rests thereof are squeezed therein) squeezed into the renewable hearth described above are removed by the discharge device 6, recesses are formed on the surface of the hearth. In addition, when degraded and expanded renewable hearth is caught by the discharge device 6, part of the renewable hearth is peeled off, thereby forming concave portions and convex portions on the surface of the renewable hearth. In particular, when the overgrown metal Fe as described above is removed, a large recess may be formed on the surface of the renewable hearth in some cases. In addition, when the metal Fe and slag Sg squeezed into the renewable hearth are not discharged, convex portions are formed on the surface of the renewable hearth thereby (see FIG. 5).

In addition, with the operation time, a front edge portion (contact portion in contact with materials to be discharged) of the discharge device 6 is damaged, such as wear or chipping, by discharge operation, such as discharge of the granular metal Fe, or scraping of the renewable hearth. When the front edge portion described above is damaged, the renewable hearth is unevenly scraped off, and as a result, concave and convex portions are likely to be formed on the surface of the renewable hearth after the scraping. In addition, when the front edge portion is damaged, the granular metal Fe and slag Sg present on the renewable hearth cannot be discharged, and parts of the granular metal Fe and slag Sg may be squeezed therein, thereby forming convex portions on the surface of the renewable hearth in some cases.

When the concave and convex portions are formed on the surface of the renewable hearth, the raw agglomerates thus fed may be unevenly heated because of the presence of the concave and convex portions, the metallic iron or the slag may be accumulated in the concave portions so that the metallic iron is overgrown, or as a result, melting thereof may be facilitated thereby. When the concave and convex portions are formed as described above, the thickness of the raw agglomerates cannot be made uniform by the raw material-leveling means 8 (FIG. 10). In the operation described above, the production efficiency of the metallic iron is decreased.

The renewal of the renewable hearth of the present invention restores the functions of the renewable hearth that were degraded as described above so that the stable metallic iron production can be continued, and examples of renewing methods are shown in FIGS. 6 to 9.

Figure 6:
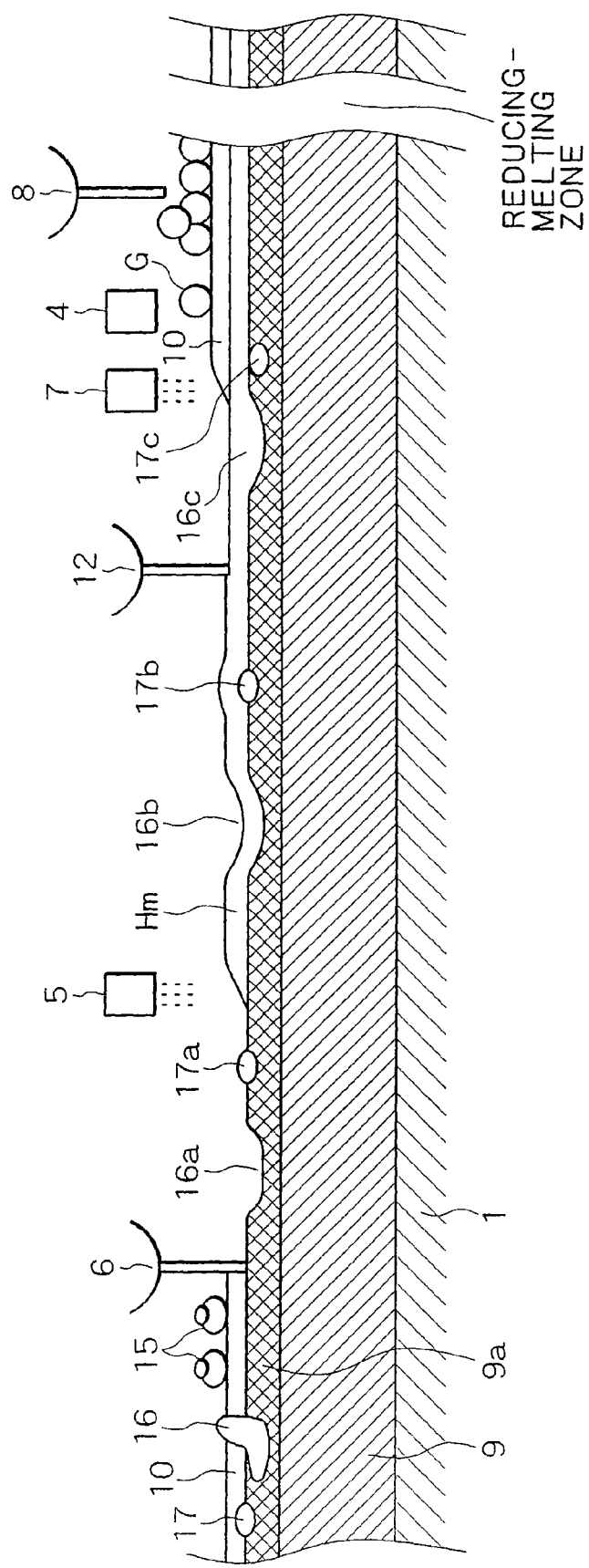
FIG. 6 is a schematic view showing one example of the present invention.

In FIG. 6, the front edge portion of the discharge device is disposed in the vicinity of the surface of the degraded portion 9a of the renewable hearth and discharges metallic iron Fe (15 in the figure) and slag Sg present on the degraded portion 9a of the renewable hearth outside the furnace (in this case, the degraded portion 9a of the renewable hearth is not scraped off). However, an overgrown material (16), which is formed of the metal Fe on the surface of the degraded portion of the renewable hearth combined with the metal Fe squeezed therein, may be caught by the front edge portion of a blade of the discharge device 6 and may then be discharged in some cases. In addition, as described above, a degraded renewable hearth may be removed by the discharge device 6, that is, may be peeled off from the surface of the renewable hearth in some cases. When the overgrown material is removed or the peeling occurs as described above, a concave portion 16a is formed on the surface of the renewable hearth. Furthermore, when the slag Sg (17) having a part projecting above the surface of the degraded portion 9a of the renewable hearth cannot be substantially squeezed therein by the discharge device 6, a convex portion 17a is formed on the surface of the degraded portion 9a of the renewable hearth. In particular, when the front edge portion of the blade of the discharge device 6 is damaged as described above, concave and convex portions are likely to be formed on the surface of the degraded portion.

After the metal Fe and slag Sg are discharged by the discharge device 6, the degraded portion 9a of the renewable hearth is renewed by feeding the hearth material onto the degraded portion 9a of the renewable hearth from the hearth material-feeding means 5. In this case, the thickness of a layer of a new renewable hearth provided on the degraded portion of the renewable hearth is not particularly limited, the feed amount of the hearth material may be optionally changed in accordance with the degree of degradation of the hearth, and for example, a hearth material Hm may be fed so as to have a thickness of 2 mm or more. In addition, for example, depending on the degree of degradation, the hearth material Hm may be fed only to the concave portion 16a from the hearth material-feeding means 15. However, in the case described above, accurate control is required, and in addition, it is difficult to ideally smooth the concave portion only by feeding the hearth material Hm.

In addition, even when the hearth material Hm is fed (continuously or intermittently) onto the surface of the renewable hearth from the hearth material-feeding means 15, the concave and convex portions (concave portion 16b, convex portion 17b) still remain on the newly formed surface of the renewable hearth.

Accordingly, in the present invention, after the renewable hearth is newly formed, prior to the feed of the raw agglomerates, leveling of the surface of the renewable hearth thus formed is performed by the renewable hearth-leveling means 12 (16c, 17c).

Particular operation of the renewable hearth-leveling means 12 will be described with reference to FIG. 9. Reference numeral 20 in FIGS. 9(A) and (B) indicates the same portion, (A) is a view showing the state prior to the leveling operation, and (B) is a view showing the state after the leveling operation.

The renewable hearth-leveling means 12 is not particularly limited as long as having a leveling function of leveling the surface of the renewable hearth, and for example, a series of plates disposed in an intersecting direction may be used, or the same device as the discharge device 6 may also be used. The particular structure is disclosed, for example, in U.S. Pat. No. 6,251,161. In the case of the present invention, the discharge device disclosed in U.S. Pat. No. 6,251,161 is used as the renewable hearth-leveling means 12. This device moves the fed hearth material in the direction intersecting the moving direction of the renewable hearth so as to fill the concave portions thereon.

A concave and a convex portion shown in FIG. 9(A) are the concave and convex portions (16b, 17b) remaining on the surface of the newly formed renewable hearth. When the front edge portion of the blade of the renewable hearth-leveling means 12 is disposed at an optional depth in the hearth material Hm, the hearth material present at the upper side of the front edge portion of the blade is blocked at a front edge portion 12b of the blade and is mounded as an excessive hearth material Hm in the vicinity of the renewable hearth-leveling means 12, and hence when being moved in the vicinity of the front edge 12b of the blade, the concave portion 16b is filled with the excessive hearth material Hm (16c). On the other hand, since the convex portion 17b is squeezed lower than the front edge portion of the blade (17b), the surface of the renewable hearth can be smoothed by the renewable hearth-leveling means 12 (B). In this case, since the newly formed surface of the renewable hearth is composed of a granular hearth material, when only the surface thereof is leveled, the front edge portion of the blade of the renewable hearth-leveling means 12 may be made of a flexible material, the width 12a of the front edge portion of the blade may be decreased, or the depth thereof may be adjusted to be shallower. In addition, in order to compact the granular hearth material on the surface of the renewable hearth, the front edge portion of the blade of the renewable hearth-leveling means 12 may has a tilt angle of 90° or more at the entry side, the width 12a of the front edge of the blade may be increased, or the position thereof in the vertical direction may be adjusted to be deeper. When the discharge device disclosed in U.S. Pat. No. 6,251,161 is used as the renewable hearth-leveling means 12, it is preferable since the renewable hearth can be compacted when being leveled.

In the case in which the surface of the renewable hearth is not compacted, when the raw agglomerates G are fed onto the renewable hearth, the renewable hearth may be compacted by the weight of the raw agglomerates to form recesses in some cases, so that the smoothness of the surface of the renewable hearth may be lost. Accordingly, the renewable hearth is preferably compacted by the renewable hearth-leveling means 12 as described above.

In addition, when the gap between the front edge portion of the renewable hearth-leveling means 12 and the newly formed renewable hearth is adjusted, the thickness of the renewable hearth can be controlled.

Figure 7:
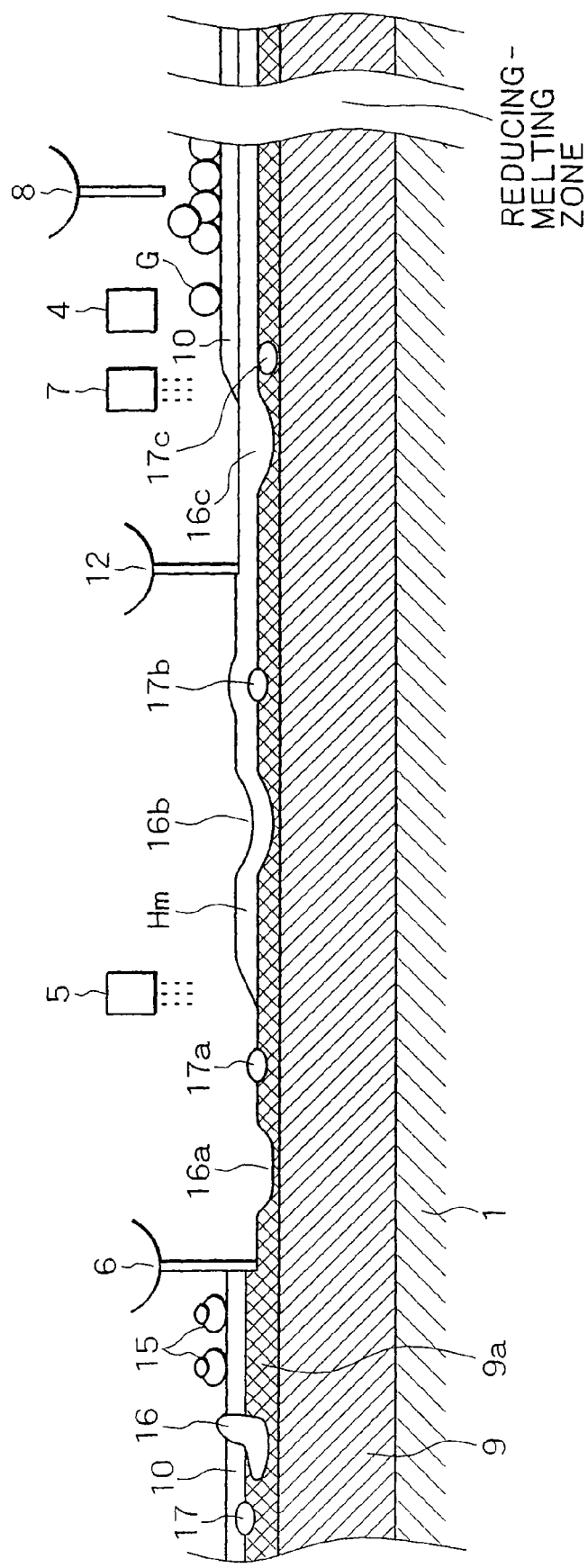
FIG. 7 is a schematic view showing one example of the present invention.
Figure 8:
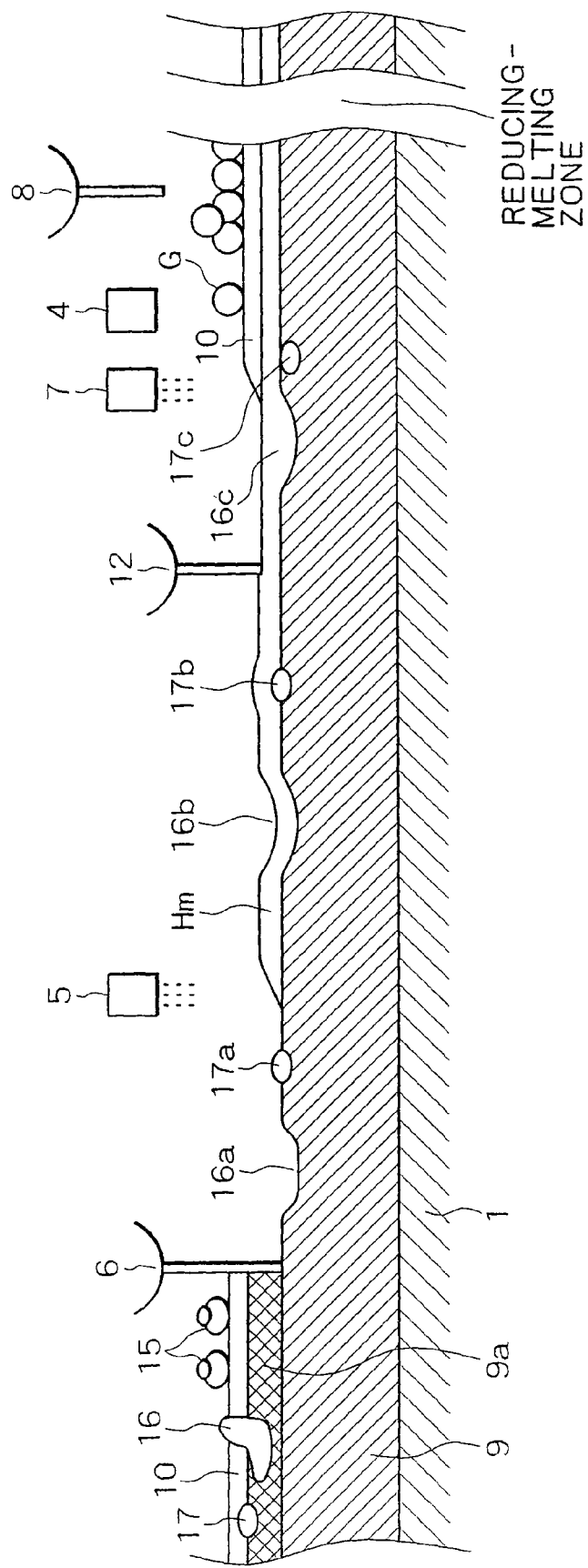
FIG. 8 is a schematic view showing one example of the present invention.

In the case of the structure shown in FIG. 6, since the front edge portion of the blade of the discharge device 6 is located slightly above-the degraded portion 9a of the renewable hearth, when the hearth material is newly fed, a new layer of the renewable hearth is formed on the degraded portion of the renewable hearth, thereby restoring the functions of the renewable hearth. As described above, when the operation is continued while the hearth material is fed onto the surface of the degraded portion of the renewable hearth, since the thickness of the renewable hearth itself is increased, in accordance with the thickness thereof, the discharge device 6, the renewable hearth-leveling means 12, or the like may be raised so that the position of each front edge portion is adjusted. In addition, when the thickness of the renewable hearth reaches a predetermined height, or when a predetermined time passes, part or the entirety of the renewable hearth may be removed by lowering the discharge device 6 as shown in FIGS. 7 and 8.

An example in which metallic iron is continuously produced while part of the degraded portion of the renewable hearth is removed will be described with reference to FIG. 7.

In the example shown in the figure, prior to the feed of the raw agglomerates, a renewable hearth having a layered structure, which can be renewed, is formed by bedding the granular hearth material on the moving hearth 1 as described above, part of the renewable hearth which is degraded during the operation is removed, the hearth material is newly fed to newly form a renewable hearth, and the surface of the newly formed renewable hearth is leveled. Subsequently, the raw agglomerates are fed, thereby producing metallic iron. Accordingly, the front edge portion of the blade of the discharge device 6 is set at an optional position of the degraded portion of the renewable hearth so that the part of the degraded portion of the renewable hearth (upper side of the front edge portion of the blade of the discharge device) is discharged together with the metallic iron Fe (15). In addition, concomitant with the discharge described above, slag 17, metallic iron (not shown), and the like present at the upper side of the front edge portion of the blade are discharged together with the degraded portion of the renewable hearth.

In the case described above, as is the case described above shown in FIG. 6, although the convex portion 17a and the concave portion 16a are formed on the degraded portion of the renewable hearth, the surface of the newly formed renewable hearth can be leveled by the renewable hearth-leveling means 12 (the particular operation of the renewable hearth-leveling means 12 is equivalent to that shown in FIGS. 6 and 9).

An example will be described with reference to FIG. 8 in which metallic iron is continuously produced while the entire degraded portion of the renewable hearth is removed.

In the example shown in the figure, prior to the feed of the raw agglomerates, a renewable hearth having a layered structure, which can be renewed, is formed by bedding the granular hearth material on the moving hearth 1 as described above, the entirety of the renewable hearth which is degraded during the operation is removed, a new hearth material is then fed to newly form a renewable hearth, and the surface of the newly formed hearth is leveled. Subsequently, the raw agglomerates are fed, thereby producing metallic iron. Accordingly, the front edge portion of the blade of the discharge device 6 is set at an optional position under the degraded portion of the renewable hearth, and the degraded portion of the renewable hearth is discharged together with the metallic iron Fe (15). In addition, concomitant with the discharge described above, the slag 17, metallic iron (not shown), and the like present in the degraded portion of the renewable hearth are simultaneously discharged.

In this case, since a new surface of the renewable hearth that is not degraded is exposed, the functions of the renewable hearth are restored, and hence stable production of metallic iron can be continued.

Since the degree of infiltration of molten slag into the renewable hearth varies, as in the case shown in FIG. 6, on the newly exposed surface of the renewable hearth described above, the convex portion 17a and the concave portion 16a may be formed at the degraded portion of the renewable hearth in some cases depending on the position of the blade of the discharge device; however, in the case described above, the newly formed surface of the renewable hearth may be leveled by the renewable hearth-leveling means 12 (the particular operation of the renewable hearth-leveling means 12 is equivalent to that shown in FIGS. 6 and 9). In addition, when the blade of the discharge device is disposed at a deeper position, concaves and convexes caused by metallic iron Fe (16) and the slag Sg (17) may not be formed in some cases on the newly exposed surface of the renewable hearth. However, since the inside of the furnace is maintained at a high temperature, when the hearth material Hm is fed onto the hearth, by upward blowing of gases in the furnace or the like, the hearth material may not be fed evenly onto the hearth, and hence concaves and convexes may be formed on the newly formed surface of the renewable hearth in some cases. Accordingly, in the case described above, the newly formed surface of the renewable hearth is preferably leveled by the renewable hearth-leveling means 12 as described above.

In addition, depending on the amount of removed degraded portion and the feed amount of the hearth material Hm, since the thickness of the renewable hearth may be decreased in some cases, when the thickness of the renewable hearth reaches a predetermined value, the feed amount of the hearth material may be increased so as to have a given thickness.

The particular structure of the discharge device 6 of the present invention is not specifically limited, and optional removing means (not shown) may be used. For example, a scraper type or a screw type may be used.

Furthermore, a method for moving the discharge device 6, renewable hearth-leveling means 12, raw material-leveling means 8, or the like in the vertical direction is not specifically limited, and a jack, a hydraulic or air cylinder, or the like may be used for control.

In the present invention, in accordance with the particular degree of degradation of the renewable hearth or operation conditions, the degraded portion 9a of the renewable hearth may be removed. For example, the structures shown in FIGS. 6 to 9 described above may be optionally combined with each other for performing the operation. In addition, for example, without removing the degraded portion 9a of the renewable hearth as shown in FIG. 6, the operation is continued while the hearth material is fed thereon, and when the renewable hearth reaches a predetermined height, or when a predetermined time passes, part or the entirety of the renewable hearth may be removed by the discharge device 6 as shown in FIGS. 7 and 8.

In addition, when the operation is continuously performed while the renewable hearth is sequentially removed by the discharge device 6 (FIGS. 7 and 8), the height of the renewable hearth may be lowered in some cases; however, in the case described above, when the height of the renewable hearth is lowered to a predetermined position, the feed amount of the hearth material may be increased so that the height of the renewable hearth again has the initial set value. In addition, whenever the degraded portion of the renewable hearth is removed, the hearth material may be newly fed so that thickness of the renewable hearth again has a predetermined value.

Of course, the front edge portion of the blade of the discharge device 6 may be set in the vicinity of the moving hearth 1 so as to remove almost the entire amount of the renewable hearth every time, the hearth material may be fed from the hearth material-feeding means 5 so as to form the renewable hearth, and the raw agglomerates may be fed after the surface of the renewable hearth is leveled (preferably compacted in this step) by the renewable hearth-leveling means 12; however, in the case described above, since the consumption of the hearth material is increased, the operation cost is increased.

Of course, as long as the objects described above can be achieved by leveling the renewable hearth, any method may be used in addition to those described above by way of example.

As the hearth material, a powdered carbonaceous material may be used, and as the carbonaceous material, for example, there may be mentioned coal (hard coal, bituminous coal, sub-bituminous coal, brown coal, or the like), reformed coal, petrocoke, or coke breeze.

In addition, as described above, since the renewable hearth is exposed to a high temperature in the furnace and is infiltrated and corroded by the molten slag, a high melting point material having corrosion resistance against molten slag may be used as the hearth material. As the hearth material described above, an oxide containing alumina or magnesia or a material containing silicon carbide may be mentioned by way of example; however, another material having properties similar to those described above may also be used. In the present invention, the hearth materials as described above may be used alone or in combination. When the renewable hearth is formed of a hearth material that contains a high melting point material having superior corrosion resistance as described above, the degradation of the renewable hearth caused by corrosion by the molten slag can be slowed, the consumption of the hearth material can be reduced, and as a result, the operation rate of facility can be increased.

Furthermore, when the hearth material is a hearth material containing a high melting point material having corrosion resistance and a carbonaceous material, the carbonaceous material is consumed by combustion during carburizing and melting, and in addition, the renewable hearth is sintered to form the porous structure having an appropriate strength. When the porous structure described above is formed, since the degradation and expansion of the renewable hearth can be suppressed, the formation of relatively large recesses formed by removal of the degraded and expanded portion can be prevented. In addition, when the renewable hearth has the porous structure, it is preferable since the discharge of the renewable hearth can be easily performed by the discharge device 6, and the damage to the front edge portion of the blade of the discharge device 6 can be reduced. In particular, it is more preferable when coal is used as the carbonaceous material. The reason for this is that since ash in the coal effectively serves as a binder for binding the particles of the hearth material (high melting point material) to each other, the renewable hearth becomes to have an appropriate strength when the raw agglomerates are fed, or the metallic iron product and the slag Sg are discharged. In addition, when the binder effect of the ash contained in coal is primarily expected, without being limited to the composition ratio of the carbonaceous material described below, a composition ratio having a desired binder effect may be selected.

When the high melting point material and the carbonaceous material are mixed together, the composition ratio of the high melting point material to the carbonaceous material is not specifically limited; however, when the amount of the carbonaceous material is small, since the renewable hearth cannot be satisfactorily formed so as to have pores therein, the effect of suppressing degradation and expansion caused by infiltration of molten slag and the easiness of removing the degraded portion 9a of the renewable hearth are decreased. On the other hand, when the amount of the carbonaceous material is excessive, since a predetermined strength of the renewable hearth cannot be obtained, recesses may be formed thereon by the weight of the raw agglomerates G, or infiltration of the molten slag is likely to occur. In addition, since the carbonaceous material is consumed by combustion in the furnace, the hearth material must be continuously fed, and as a result, it is not preferable since the cost is increased. It is recommended that the ratio of the high melting point material to the carbonaceous material be preferably in the range of from 20 to 80 to 80 to 20, and more preferably, from 70 to 30 to 30 to 70.

In addition, in the present invention, in order to reduce the amount of sulfur in the metallic iron Fe (15), a material such as limestone or dolomite, which is to be used as a CaO source or an MgO source, may be mixed with the hearth material or may be supplied onto the surfaces of the raw agglomerates G.

In addition, in the present invention, the hearth material may contain a sintering promoter. When the sintering promoter is blended in the hearth material, it is preferable since the binder effect described above of binding particles of the high melting point material to each other can be obtained. As the sintering promoter, a silica compound such as kaolin may be mentioned by way of example: however, as long as having the effect as a binder, another material may also be used.

The composition ratio of the sintering promoter is not specifically limited as long as having the binder effect, and in general the content thereof is approximately 3 to 15%. Since the silica compound mentioned above as the sintering promoter by way of example has inferior corrosion resistance against molten slag, a large amount of the silica compound is not preferably blended in the hearth material.

The particle diameters of the high melting point material, carbonaceous material, and sintering promoter, which are contained in the hearth material, are not specifically limited; however, in order to suppresses the infiltration of the molten slag and to maintain the well-balanced relationship between the strength, which can withstand the operations of the feed of the raw agglomerates and the discharge of the metallic iron product and slag, and the easiness of removing the degraded portion of the renewable hearth, it is recommended that the average particle diameter be preferably 4 mm or less, and more preferably, 2 mm or less.

As shown in FIGS. 6 to 9, prior to the feed of the raw agglomerates, an atmosphere-adjusting agent 10 containing a powdered carbonaceous material is bedded on the renewable hearth 9 so as to form a layered structure, and the raw agglomerates may then be fed thereon. By feeding the atmosphere-adjusting agent 10 from the atmosphere-adjusting agent-feeding means 7, while degradation of a reducing atmosphere in the vicinity of the raw agglomerates G, which is caused by an oxidizing burner-combustion gas containing $CO_2$ or $H_2O$, is suppressed, reduction, carburization, and melting of the raw agglomerates G can be efficiently performed, and in addition, since the amount of FeO remaining in the molten slag is reduced, the infiltration into the renewable hearth and the corrosion thereof can be suppressed. Furthermore, since being burned in the furnace after the reducing atmosphere in the vicinity of the raw agglomerates G is enhanced, the atmosphere-adjusting agent also serves as a fuel, and hence the consumption of burner fuel such as a natural gas can be reduced. In addition, besides the suppression of the infiltration of the molten slag into the renewable hearth, the atmosphere-adjusting agent allows the metallic iron Fe and the slag Sg to be easily separated from the renewable hearth, and hence the discharge thereof outside the furnace can be more smoothly performed.

As the atmosphere-adjusting agent described above, for example, there may be mentioned powdered coal (hard coal, bituminous coal, sub-bituminous coal, brown coal, or the like), powdered reformed coal, powdered petrocoke, or coke breeze. The thickness of the atmosphere-adjusting agent is not specifically limited; however, in order to efficiently obtain the effect of enhancing the reducing atmosphere in the vicinity of the raw agglomerates or the effect of smoothly discharging the metallic iron and slag, a significantly small thickness may work well, and in general, the object can be satisfactorily achieved even when the thickness is approximately 1 to 10 mm. In addition, since being consumed in the furnace by combustion, it is preferable that the atmosphere-adjusting agent be continuously fed.

The average particle diameter of the atmosphere-adjusting agent is not specifically limited; however, it is recommended that the average particle diameter be preferably 5 mm or less, and more preferably, 2 mm or less.

In addition, in the present invention, in order to reduce the amount of sulfur in the metallic iron Fe (15), a material such as limestone or dolomite, which is to be used as a CaO source or an MgO source, may be mixed with the atmosphere-adjusting agent.

In addition, when the hearth material at an appropriate amount is blended in the atmosphere-adjusting agent, since the effect of restoring the functions of the degraded portion of the renewable hearth can be obtained, this blending is recommended as a simple method. The hearth material blended in the atmosphere-adjusting agent is moved to the discharge device 6 by the rotation of the hearth and is squeezed into the surface layer of the renewable hearth by the discharge device, thereby restoring the functions of the renewable hearth. In general, the composition ratio of the hearth material to the atmosphere-adjusting agent is preferably 30 to 70%. When the composition ratio of the hearth material is too small, the effect of restoring the degraded portion of the renewable hearth is decreased, and when the composition ratio of the hearth material is too large, the atmosphere-adjusting effect is deceased. Blending of the hearth material in the atmosphere-adjusting agent is not always necessary and may be performed only when the functions of the degraded portion of the renewable hearth are restored. Furthermore, according to the method described above, the hearth material and the atmosphere-adjusting agent can be fed by one common feeding device, and hence it is preferable since the facility cost and the installation space can be reduced.

Prior to the feed of the raw agglomerates, the atmosphere-adjusting agent containing a powdered carbonaceous material may be fed onto the renewable hearth 9 by the atmosphere-adjusting agent-feeding means. The feeding position is not specifically limited, and the atmosphere-adjusting agent may be fed simultaneously with the raw agglomerates or before the feed thereof from a position different from that at which the raw agglomerates is fed. Since the lower edge of the blade of the discharge device 6 is always in contact with the surface of the renewable hearth formed of the hearth material containing high melting point material, such as alumina or magnesia, which have high abrasive properties, the blade is considerably abraded. However, by feeding the atmosphere-adjusting agent to form a thick layer thereof, since part of the atmosphere-adjusting agent remains (thin film) in the discharge step after reducing and melting, when the front edge portion of the blade is brought into contact with the atmosphere-adjusting agent layer, the life of the blade can be increased as compared to that obtained in the case in which the renewable hearth is directly removed, thereby increasing the operation rate of the facility. Of course, when a thick film can be formed from the atmosphere-adjusting agent, the feed thereof may be performed from the atmosphere-adjusting agent-feeding means 7; however, depending on the moving speed of the hearth, the amount of the atmosphere-adjusting agent, which is sufficient to obtain the effect described above, may not be fed once, and hence the feed thereof is preferably performed in twice. In the case in which the feed is performed in twice, the composition of the atmosphere-adjusting agent for the first feed and that for the second feed may be or may not be different from each other. In the case in which the feed is performed in twice, the positions at which the atmosphere-adjusting agent is fed are not specifically limited, and the atmosphere-adjusting agent may be fed simultaneously with the raw agglomerates or before or after the feed thereof from a position different from that at which the raw agglomerates is fed.

When the degree of the infiltration of the slag increases, and the degradation of the renewable hearth proceeds, an overgrown metallic iron cannot be cooled and solidified in the cooling zone, and hence the molten iron itself reaches the discharge device. In this case, it becomes difficult to discharge the overgrown metallic iron outside the furnace by the discharge device, and as a result, the operation may not be continued in some cases. In this case, when the molten iron can be solidified by supplying a coolant on the surface of the renewable hearth, the molten iron can be discharged, and hence the operation can be continued. As the coolants in the present invention, in addition to liquids and gases, a high melting point material such as alumina or magnesia may also be used. For example, by feeding a hearth material containing a high melting point material such as alumina or magnesia to the molten iron portion, the molten iron may be cooled and solidified. In addition, by installing a water spray device so as to supply water to the molten iron portion, the molten iron may be cooled and solidified.

When the degraded portion of the renewable hearth is removed as described above, depending on the conditions of the renewable hearth, the removal may not be easily performed in some cases; however, in this case, when the renewable hearth is softened, the removal can be smoothly performed. A method for softening the renewable hearth is not specifically limited, and for example, there may be mentioned a method in which the burner combustion amount is increased to increase a furnace temperature so that a temperature of the renewable hearth is increased for softening; or a method in which a burner is installed which is exclusively used for direct heating of the renewable hearth so that a temperature thereof is increased for softening. The temperature of the renewable hearth in this step is not specifically limited and may be optionally set in accordance with the properties of the renewable hearth. However, at the degraded portion of the renewable hearth in which the infiltration of the slag proceeds, the temperature is preferably in the range of 1,300 to 1,550, and more preferably, in the range of 1,450 to 1,550° C.

As another method, softening may be performed by supplying to the renewable hearth an additive having the effect of decreasing the melting point of the renewable hearth. As the additive described above, for example, there may be mentioned calcium oxide, sodium oxide, sodium carbonate, or calcium fluoride.

Between the moving hearth and the renewable hearth, or between the renewable hearth and a renewable hearth provided thereon, a carbon material such as a powdered carbonaceous material is bedded to form a layered carbonaceous layer, and removal may be performed by lowering the front edge portion of the blade of the discharge device to an optional position of the carbonaceous layer. Since the carbonaceous layer maintains the powder properties, the renewable hearth provided on the layer described above can be easily removed therefrom.

According to the present invention described above, the operation rate of the hearth can be significantly increased, and hence long and stable production of metallic iron can be achieved.

According to the above descriptions, the raw agglomerates in the form of pellets are described as the mixture of raw materials; however, when powder is used as the mixture of raw materials, the advantages of the present invention described above can also be obtained.

Hereinafter, the present invention will be described in detail with reference to an example; however, the present invention is not limited to the example described below, and it is to be understood that any modification performed without departing from the purposes described above and below is included in the technical scope of the present invention.

EXAMPLES

Example 1

Metallic iron is produced by feeding agglomerates (a diameter of approximately 16 mm) containing iron ore and coal into a moving hearth reducing-melting furnace shown in FIG. 1. After solid reduction is performed by controlling the furnace-atmosphere temperature at approximately 1,350° C. until the metallization rate reaches approximately 90% or more, and melting is then preformed in a melting zone (an atmospheric temperature of 1,450° C.), the metallic iron thus produced and by-product slag are cooled to approximately 1,000° C. for solidification and are then discharged outside the furnace by the discharge device (approximately 12 minutes from the feed of the raw materials to the discharge thereof). The granular metallic iron (a diameter of approximately 10 mm) thus obtained has a high iron quality (an iron component of approximately 97%, a carbon component of approximately 3%).

After a hearth material is bedded on a hearth by using the hearth material-feeding means 5 so as to form a layered renewable hearth having a thickness of 15 mm prior to the feed of the agglomerates, the renewable hearth is compacted while being leveled in the width direction of the hearth by the renewable hearth-leveling means 12 so that the height of the surface of the renewable hearth becomes uniform. Subsequently, after an atmosphere-adjusting agent (material: coal) is bedded on the renewable hearth, operation is performed by feeding the agglomerates onto the layer formed of the atmosphere-adjusting agent. After reducing and melting, metallic iron and the like are obtained by cooling and solidification and are then recovered by a discharge device provided at the most downstream side. In addition, after 24 hours from the start of the operation, a blade (lower edge portion) of the discharge device is disposed at a distance of 2 mm from the surface of the renewable hearth, and part of a degraded portion of the renewable hearth is discharged together with the metallic iron. After the discharge, a new hearth material is fed from the hearth material-feeding means 5 so as to newly form a layered renewable hearth having a thickness of 3 mm, and the surface of the renewable hearth is compacted so that the thickness of the renewable hearth is 15 mm while being leveled by the front edge portion of the blade of the renewable hearth-leveling means 12 which is disposed at the same level as that of the blade of the discharge device. When the operation of renewing the hearth is performed once per day, a stable continuous operation can be performed for a predetermined period of time (for example, three weeks from the start of the operation). During the operation period, concaves and convexes are not formed on the surface of the renewable hearth.

Comparative Example

Metallic iron is produced in the same manner as that in the example described above except that the surface of the renewable hearth is not leveled by the renewable hearth-leveling means 12, and operation states are investigated. Concaves and convexes are formed on the surface of the renewable hearth, the renewable hearth is likely to be infiltrated and corroded by slag, the production efficiency of metallic iron is lower than that in the case of example 1, the maintainability is also low, and hence repair of the renewable hearth must be performed more frequently.

What is claimed is:

1. A method for producing metallic iron, in which after a mixture including a carbonaceous reducing agent and iron oxide is fed onto a hearth of a moving hearth reducing-melting furnace at a first position and is then heated so that the iron oxide is reduced and melted, metallic iron to be obtained is cooled and is then discharged at a second position downstream of said first position in the direction of movement of the moving hearth outside the furnace for recovery, the method comprising the steps of:
prior to the feed of the mixture, bedding a hearth material on the hearth for forming a layered renewable hearth which is renewable;
feeding the hearth material on the surface of the renewable hearth which is degraded during operation to form recesses and convex portions, at a third position upstream of said first position in the direction of movement of the moving hearth, so as to form a new surface of the hearth;
leveling the new surface of the hearth, at a location upstream of said first position in the direction of movement of the moving hearth and between said third position and said first position, to level said recess and convex portions in the new surface of the hearth; and
subsequently feeding the mixture for producing the metallic iron.

2. The method according to claim 1, wherein the hearth material is fed so as to fill a recess formed on the surface of the degraded renewable hearth.

3. The method according to claim 1, wherein the leveling comprises moving the fed hearth material in the direction intersecting the moving direction of the moving hearth.

4. The method according to claim 1, wherein the thickness of the renewable hearth is adjusted.

5. The method according to claim 1, wherein, after the renewable hearth is leveled, the hearth material is further fed so as to complete the renewal prior to the feed of the mixture.

6. The method according to claim 1, wherein the hearth material comprises a carbonaceous material.

7. The method according to claim 1, wherein the hearth material comprises a high melting point material having corrosion resistance against produced slag.

8. The method according to claim 7, wherein the high melting point material comprises an oxide containing alumina and/or magnesia or silicon carbide.

9. The method according to claim 7, wherein the hearth material further comprises a carbonaceous material.

10. The method according to claim 6, wherein the hearth material further comprises a material which is to be used as a CaO source or an MgO source.

11. The method according to claim 6, wherein the hearth material further comprises a sintering promoter.

12. The method according to claim 1, wherein the cooling is performed by supplying a coolant or the hearth material.

13. The method according to claim 1, wherein, before the feed of the mixture, an atmosphere-adjusting agent containing a powdered carbonaceous material is bedded on the renewable hearth, which has been renewed, so as to form a layered structure, and subsequently the mixture is fed.

14. The method according to claim 13, wherein the atmosphere-adjusting agent comprises a material which is to be used as a CaO source or an MgO source.

15. The method according to claim 13, wherein the hearth material is blended in the atmosphere-adjusting agent.

16. The method according to claim 13, wherein the atmosphere-adjusting agent is fed in twice or more.

17. The method according to claim 1, wherein a layer containing a powdered carbonaceous material is present between the moving hearth and the renewable hearth or in each of a plurality of layers formed of the renewable hearths.

18. The method according to claim 1, wherein the hearth material is compacted when the surface of the hearth is leveled.

19. A method for producing metallic iron, comprising the steps of:
feeding a mixture including a carbonaceous reducing agent and iron oxide onto a moving hearth of a moving hearth reducing-melting furnace, at a first position in the direction of movement of the moving hearth, for producing the metallic iron, wherein the moving hearth comprises renewable hearth including a bedded layer of a granular hearth material;
heating the mixture so that the iron oxide is reduced and melted;
cooling the reduced and melted metallic iron; and
discharging outside the furnace, at a second position downstream of said first position in the direction of movement of the moving hearth, the cooled metallic iron and a part of the renewable hearth, wherein a remainder of the renewable hearth which is not discharged in said discharging step has been degraded to exhibit recesses and convex portions;
returning said moving hearth, moving in said direction of movement thereof, to said first position;
at a third position, upstream of said first position in the direction of movement of the moving hearth, feeding granular hearth material onto the remainder of the renewable hearth that was not removed during the discharging step for newly forming the renewable hearth; and
leveling the surface of the newly formed renewable hearth at a location upstream of said first position in the direction of movement of the moving hearth and between said third position and said first position, to level said recess and convex portions in the newly formed renewable hearth.

20. The method according to claim 19, wherein the degraded hearth further comprises melted and solidified portions of the renewable hearth.

* * * * *